United States Patent [19]

Wakabayashi et al.

[11] Patent Number: 5,678,096
[45] Date of Patent: Oct. 14, 1997

[54] CAMERA WITH AN INTERCHANGEABLE RETRACTABLE LENS BARREL

[75] Inventors: Hiroshi Wakabayashi, Yokohama; Yuji Katano, Kawasaki; Noriyasu Kotani, Tokyo; Noboru Akami, Yokahama, all of Japan

[73] Assignee: Nikon Corporation, Tokyo, Japan

[21] Appl. No.: 423,648

[22] Filed: Apr. 17, 1995

Related U.S. Application Data

[63] Continuation-in-part of Ser. No. 20,801, Feb. 22, 1993, abandoned.

[30] Foreign Application Priority Data

Feb. 25, 1992 [JP] Japan ................... 4-037980
Jun. 6, 1992 [JP] Japan ................... 4-144251

[51] Int. Cl.[6] ................... C03B 17/00; C03B 1/18
[52] U.S. Cl. ................... 396/348; 396/529; 396/87
[58] Field of Search ................... 354/288, 400, 354/195.1, 195.11, 195.12, 187, 286; 396/72, 87, 90, 348, 529, 533

[56] References Cited

U.S. PATENT DOCUMENTS

| | | | |
|---|---|---|---|
| 2,065,993 | 12/1936 | Billing | 354/190 |
| 3,620,149 | 11/1971 | Ogihara | 354/286 |
| 4,439,029 | 3/1984 | Okura et al. | 354/479 |
| 4,789,875 | 12/1988 | Wakabayashi et al. | 354/195.1 |
| 4,829,333 | 5/1989 | Inoue et al. | 354/412 |
| 4,853,725 | 8/1989 | Matsuda et al. | 354/286 |
| 4,860,043 | 8/1989 | Kurei et al. | 354/286 |
| 4,899,190 | 2/1990 | Hata | 354/400 |
| 5,066,968 | 11/1991 | Suzuki et al. | 354/400 |
| 5,097,280 | 3/1992 | Nomura | 354/286 |
| 5,113,210 | 5/1992 | Kashiyama et al. | 354/400 |
| 5,124,737 | 6/1992 | Inoue et al. | 354/400 |
| 5,160,956 | 11/1992 | Watanabe et al. | 354/286 |
| 5,218,444 | 6/1993 | Mizutani et al. | 354/404 |
| 5,257,053 | 10/1993 | Kobayashi et al. | 354/195.1 |
| 5,325,145 | 6/1994 | Hirasawa | 354/400 |
| 5,347,333 | 9/1994 | Takahashi | 354/187 |

FOREIGN PATENT DOCUMENTS 3212604  9/1991  Japan .

*Primary Examiner*—Safet Metjahic
*Assistant Examiner*—Nicholas T. Tucillo

[57] ABSTRACT

A camera including a mount portion onto which a lens barrel housing a lens is mounted as movable in a direction of an optical axis thereof, a moving mechanism for moving the lens barrel in the direction of the optical axis, a limiter for setting a limit of movement of the lens barrel moved by the moving mechanism while the lens barrel is mounted on the mount portion, and a limit remover for removing the limit of movement set by the limiter when the lens barrel is dismounted from the mount portion. The camera further includes a signal transmission apparatus in which the lens barrel is mounted as movable in the direction of the optical axis thereon on the camera body. The signal transmission apparatus includes a light emitting element located on either one of the lens barrel and the camera body, and a light receiving element located on the other one of the lens barrel and the camera body, for receiving light from the light emitting element. The light emitting element and the light receiving element perform signal transmission between a lens controller in the lens barrel and a camera controller in the camera body.

15 Claims, 18 Drawing Sheets

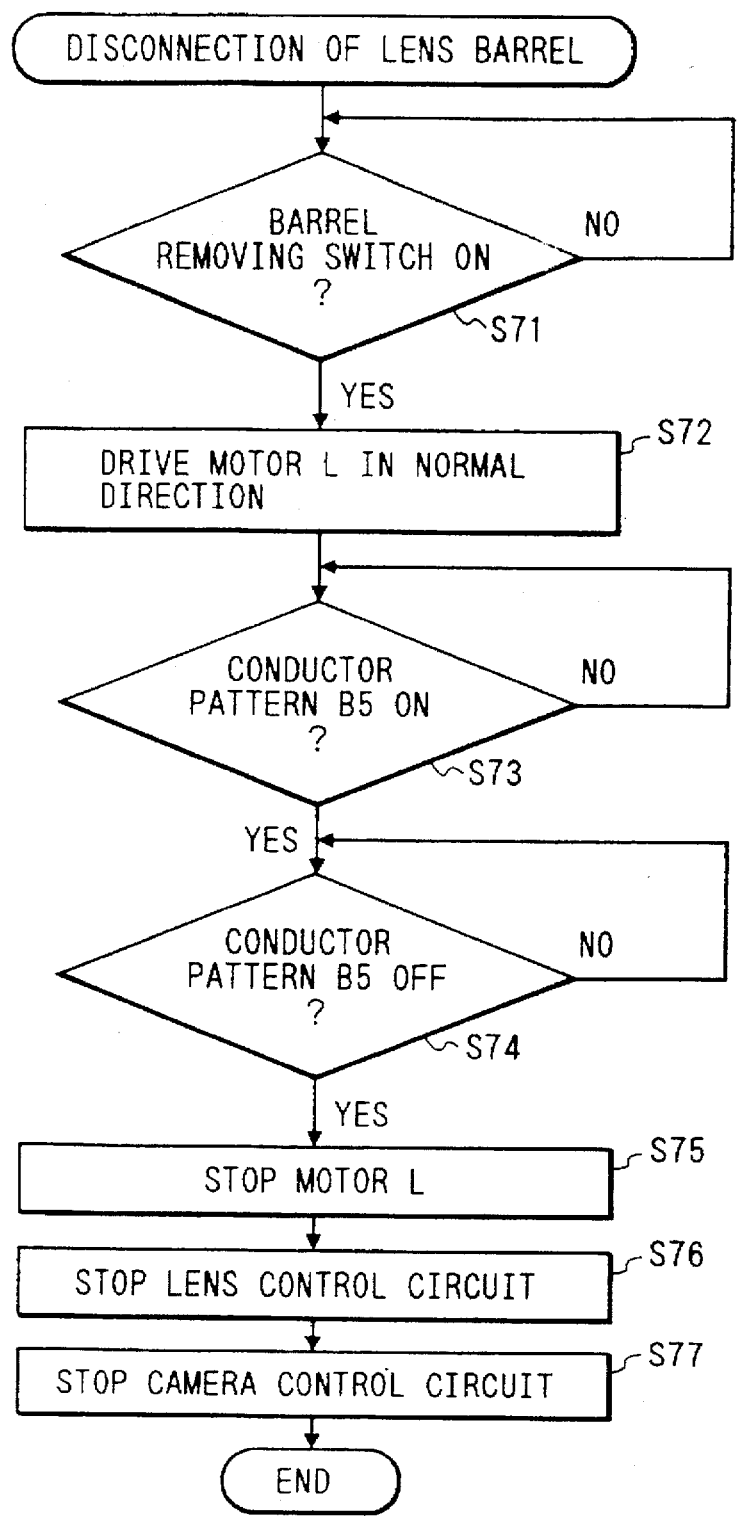

CAMERA WITH AN INTERCHANGEABLE RETRACTABLE LENS BARREL

This is a continuation-in-part application of U.S. patent application Ser. No. 08/020,801 filed Feb. 22, 1993, now abandoned.

BACKGROUND OF THE INVENTION

1. Field of the Invention

The present invention relates to a camera, and more particularly to a camera in which a lens barrel can be moved relative to a camera body between a projected position and a retracted or collapsed position. Also, the invention relates to a signal transmission apparatus in such a camera, which performs signal transmission between a camera body and a lens barrel.

2. Description of the Related Art

There are conventional cameras in which a lens barrel can be moved relative to a camera body between a projected position and a collapsed position, in which the lens barrel is mounted onto the camera body through a mount member exclusively used therefor, and in which focus adjustment is carried out by relatively moving the lens barrel to the mount member, whereby the entire camera system can be made compact.

Further, there are cameras used with an interchangeable lens, in which a lens barrel is mounted onto a camera body without using a mount member exclusive therefor.

However, the cameras, in which the lens barrel is moved relative to the camera body between the projected position and the retracted position, include such a problem that the mounting operation of the lens barrel is troublesome, because the lens barrel is mounted relative to the camera body through the mount member exclusive therefor.

In the lens interchangeable cameras, the lens barrel can be comparatively readily mounted onto the camera body. There exists, however, no lens interchangeable camera in which a lens barrel can be moved between the projected position and the collapsed position. Also, the lens interchangeable cameras lack compactness, including a problem of increasing the size of the camera.

In the conventional cameras in which the lens barrel is movable relative to the camera body, signal transmission is effected between a lens control circuit located on the lens barrel side and a camera control circuit located on the camera body side by a brush, a flexible print-circuit board (FPC), or the like.

In the case that the signal transmission is performed between the lens control circuit and the camera control circuit by using the brush, the brush must be mechanically slid on a conductor pattern with movement of the lens barrel. Once a contact becomes insecure between the conductor pattern and the brush in such an arrangement, a reliable signal transmission is not assured.

In the case that the signal transmission is carried out by using a flexible print-circuit board, the flexible print-circuit board is bent by the movement of the lens barrel. Repetition of bending causes damage on a circuit in the flexible print-circuit board, resulting in failure of signal transmission.

SUMMARY OF THE INVENTION

It is an object of the present invention in one aspect thereof to provide a camera easy in lens exchange and compact in size.

It is another object of the present invention in another aspect thereof to provide a signal transmission apparatus for a camera, which enables secure signal transmission between a lens control circuit and a camera control circuit in a simple construction.

A camera according to the present invention comprises:

a mount portion onto which a lens barrel housing a lens is mounted as movable in a direction of an optical axis thereof;

a moving circuit for moving the lens barrel in the direction of the optical axis;

a limiting unit for setting a limit of movement of the lens barrel moved by the moving unit while the lens barrel is mounted on the mount portion; and a limit removing unit for removing the limit of movement set by the limiting unit when the lens barrel is dismounted from the mount portion.

Preferably, the moving unit comprises a motor, the limit of movement set by the limiting unit is effected by limiting a drive of the motor by an electric signal, and the removing of the limit of movement by the limit removing unit is effected by canceling the limit of the drive of the motor by another electric signal.

In the camera according to the present invention, when the lens barrel is moved to a projected position or to a collapsed position, a movement range of the lens barrel is limited by the limiting unit. When the lens barrel is being mounted onto or dismounted from the camera body, the limit of movement set by the limiting unit is released.

The signal transmission apparatus according to the present invention is applicable to a camera in which a lens barrel is mounted as movable in a direction of the optical axis thereof on a camera body. The signal transmission apparatus comprises a light emitting element located on either one of the lens barrel and the camera body, and a light receiving element located on the other one of the lens barrel and the camera body, for receiving light from the light emitting element. The light emitting element and the light receiving element perform signal transmission between a first control unit in the lens barrel and a second control unit in the camera body.

It is preferable that the light emitting element and the light receiving element receiving the light therefrom be disposed to face each other along the optical axis thereof, that is, in the direction of movement of the lens barrel to secure stable signal transmission free from influence of movement of the lens barrel.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 1–10 show a first embodiment according to the present invention, in which:

FIG. 1 is a perspective view to show the first embodiment of a camera according to the present invention;

FIG. 2 is a cross sectional view to show a state in which a lens barrel is mounted on a mount portion of a camera body in the camera;

FIG. 3 is a block diagram to show circuits of the camera;

FIG. 4 is an explanatory drawing to show conductor patterns and collector brushes in the camera;

FIG. 5 is a flow chart to show an operation in mounting the lens barrel onto the camera;

FIG. 6 is a cross sectional view to show a state in mounting the lens barrel onto the camera;

FIG. 7 is a flow chart to show an operation in dismounting the lens barrel from the camera;

FIG. 8 is a flow chart to show an operation when the lens barrel is collapsed into the camera;

FIG. 9 is a cross sectional view to show a state when the lens barrel is collapsed into the camera;

FIG. 10 is a flow chart to show a state in taking a photograph with the camera;

FIGS. 11–19 show a second embodiment according to the present invention, in which:

FIG. 11 is a perspective view to show a camera provided with the second embodiment of a signal transmission apparatus according to the present invention;

FIG. 12 is a cross sectional view to show a state in which a lens barrel is mounted on a mount portion of a camera body in the camera;

FIG. 13 is a block diagram to show circuits of the camera;

FIG. 14 is an explanatory drawing to show conductor patterns and collector brushes in the camera;

FIG. 15 is a flow chart to show an operation in mounting the lens barrel onto the camera;

FIG. 16 is a cross sectional view to show a state in mounting the lens barrel onto the camera;

FIG. 17 is a flow chart to show an operation in dismounting the lens barrel from the camera;

FIG. 18 is a flow chart to show an operation when the lens barrel is collapsed into the camera; and FIG. 19 is a cross sectional view to show a state when the lens barrel is collapsed into the camera;

FIGS. 20–27 show a third embodiment according to the present invention, in which:

FIG. 20 is a perspective view to show the third embodiment of a camera according to the present invention, which is provided with a signal transmission apparatus;

FIG. 21 is a cross sectional view to show a state in which a lens barrel is mounted on a mount portion of a camera body in the camera;

FIG. 22 is a block diagram to show circuits of the camera;

FIG. 23 is an explanatory drawing to show conductor patterns and collector brushes in the camera;

FIG. 24 is a flow chart to show an operation in mounting the lens barrel onto the camera;

FIG. 25 is a cross sectional view to show a state in mounting the lens barrel from the camera;

FIG. 26 is a flow chart to show an operation in dismounting the lens barrel from the camera; and FIG. 27 is a cross sectional view to show a state when the lens barrel is collapsed into the camera.

DESCRIPTION OF THE PREFERRED EMBODIMENTS

Figure 1:
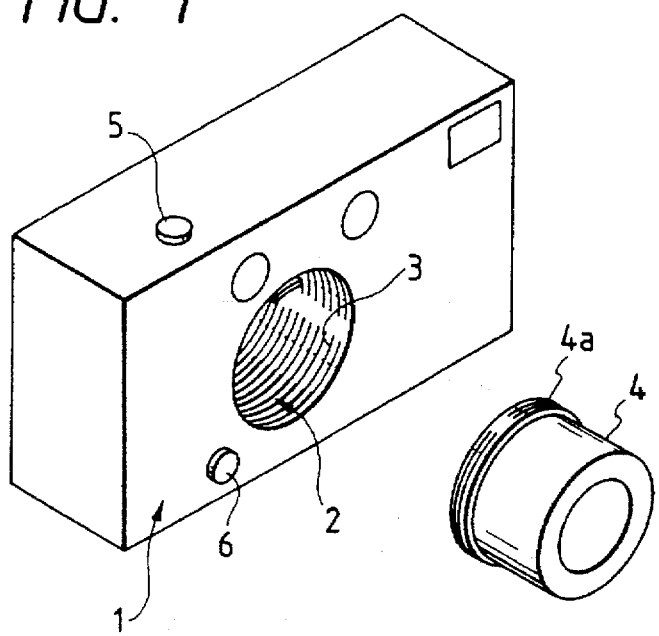

Reference will now be made in detail to the present preferred embodiments of the present invention, examples of which are illustrated in the accompanying drawings, wherein like reference numerals referred to like elements throughout.

FIG. 1 shows an embodiment of a camera according to the present invention. In FIG. 1, reference numeral 1 designates a camera body.

A mount portion 2 is formed substantially in the center of the camera body 1, and a female screw 3 is formed on the mount portion 2.

Numeral 4 denotes a lens barrel of an interchangeable lens, and a male mount portion 4a engageable in mesh with the mount portion 2 is formed on the lens barrel 4.

A barrel collapse button 5 is provided on the upper surface of the camera body 1, and the lens barrel 4 alternately takes a projected position, or a retracted or collapsed position at each push of the barrel collapse button 5.

A lens barrel removing button 6 is provided on the front surface of the camera body 1, and the lens barrel 4 is removed from the camera body 1 when the lens barrel removing button 6 is pushed.

Figure 2:
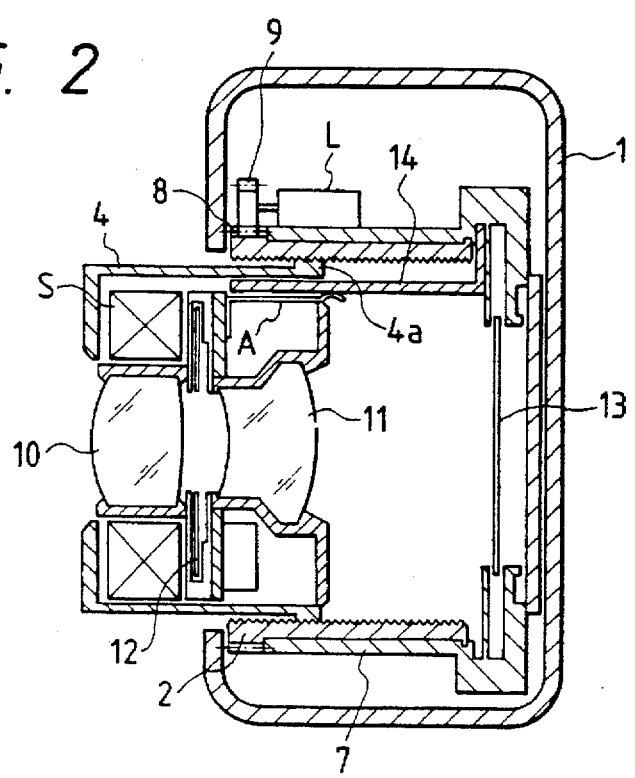

FIG. 2 shows a cross section of the camera in which the lens barrel 4 is mounted on the mount portion 2 of the camera body 1, and which is in a state to take a photograph. In FIG. 2, reference numeral 7 designates a cylindrical support member provided in the camera body 1.

The mount portion 2 is fit as rotatable in the support member 7.

A gear 8 is formed on an outer periphery of the mount portion 2 on the subject side, and a gear 9 of a motor L meshes with the gear 8.

The male mount portion 4a of the lens barrel 4 engages in mesh with the mount portion 2, and phototaking lenses 10, 11 are located inside the lens barrel 4.

Further, a motor S is situated for driving a stop 12 on the subject side of the lens barrel 4.

A focal plane shutter 13 is positioned on the support member 7 on the side opposite to the subject side. The focal plane shutter 13 is a light shielding device closed upon exchange of the lens barrel 4 in the case that the lens shutter is provided in the lens barrel 4. An end of a key 14 is fixed on the support member 7 on the focal plane shutter 13 side. The key 14 is inserted into the lens barrel 4 to guide translation of the lens barrel 4.

Moreover, electric conductor patterns B as detailed below are formed on the key 14, and collector brushes A as also described below are in contact with the electric conductor patterns B.

Figure 3:
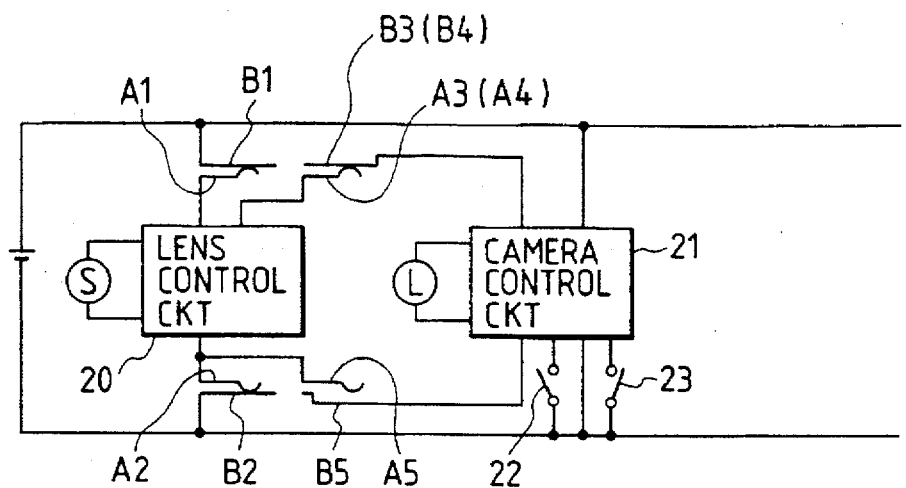

FIG. 3 is a block diagram to show circuits in the camera of this embodiment, in which numeral 20 denotes a lens control circuit and numeral 21 a camera control circuit.

The lens control circuit 20 executes a control of the motor S for driving the stop 12, the shutter, and the like provided in the lens barrel 4, data processing of detection signals of positions of the stop 12 and the shutter, and data communication with the camera control circuit 21.

The camera control circuit 21 executes signal processing of signals given from the lens barrel 4, communication with the lens control circuit 20, control and signal processing of the motor L for driving the lens barrel 4 in the camera, a film feed motor, and the like.

Collector brushes A1, A2, A3, A4, and A5 are connected to the lens control circuit 20, and these collector brushes A1, A2, A3, A4, A5 are capable of contact with conductor patterns B1, B2, B3, B4, B5, respectively, formed on the key 14. The details are described later.

A lens barrel removing switch 22 is turned on or off with a push on the lens barrel removing button 6 as shown in FIG. 1. When the lens barrel removing switch 22 is turned on, the motor L is driven to remove the lens barrel 4 from the camera body 1.

A barrel collapse switch 23 is turned on or off with a push on the barrel collapse button 5 as shown in FIG. 1. When the barrel collapse switch 23 is turned on, the lens 4 is collapsed into the camera body.

Figure 4:
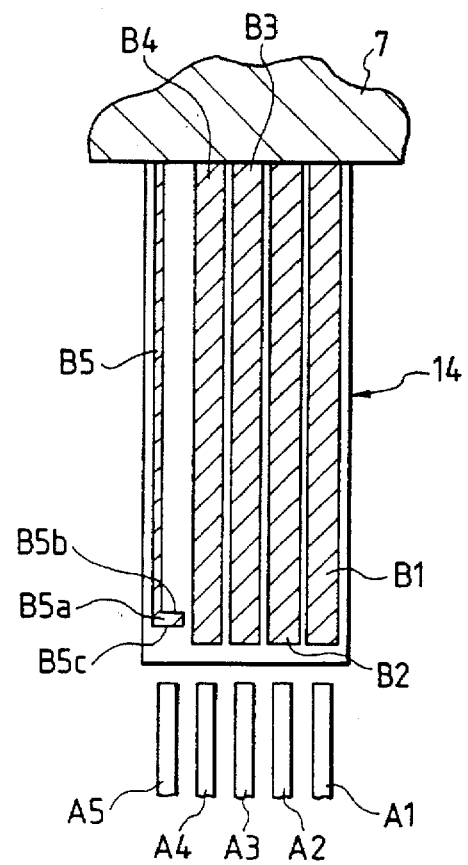

FIG. 4 shows the conductor patterns B1, B2, B3, B4, B5 formed on the key 14, which are formed such that when the lens barrel 4 is being inserted into the mount portion 2, the collector brushes A1, A2, A3, A4, A5 come into contact with the conductor patterns B1, B2, B3, B4, B5, respectively.

When the lens barrel is being inserted into the mount portion, the conductor patterns B1, B2, B3, B4 are first electrically connected to the collector brushes A1, A2, A3, A4 before the conductor pattern B5 is electrically connected to the collector brush A5. Thus, when the end portion of the lens barrel 4 is being inserted into the mount portion 2, the motor L is kept undriven and only the lens control circuit 20 is actuated at the first stage.

After that, an end B5a of the conductor pattern B5 comes into contact with the collector brush A5 to drive the motor L, whereby the mount portion 2 is rotated to set the lens barrel 4 in the mount portion 2.

The end B5a of the conductor pattern B5 is a portion for reading a position of the lens barrel 4 relative to the mount portion 2, and when the lens barrel 4 is collapsed into the mount portion 2, the collector brush A5 becomes off from an end edge BSb of the conductor pattern B5.

The position where the collector brush A5 becomes off from the end edge B5b is defined as a start position, and pulse signals in synchronism with rotation of the motor L are counted from the start position, whereby a position of the lens barrel 4 is detected for position control.

Operations of the camera as described will be explained in detail with flow charts.

Figure 5:
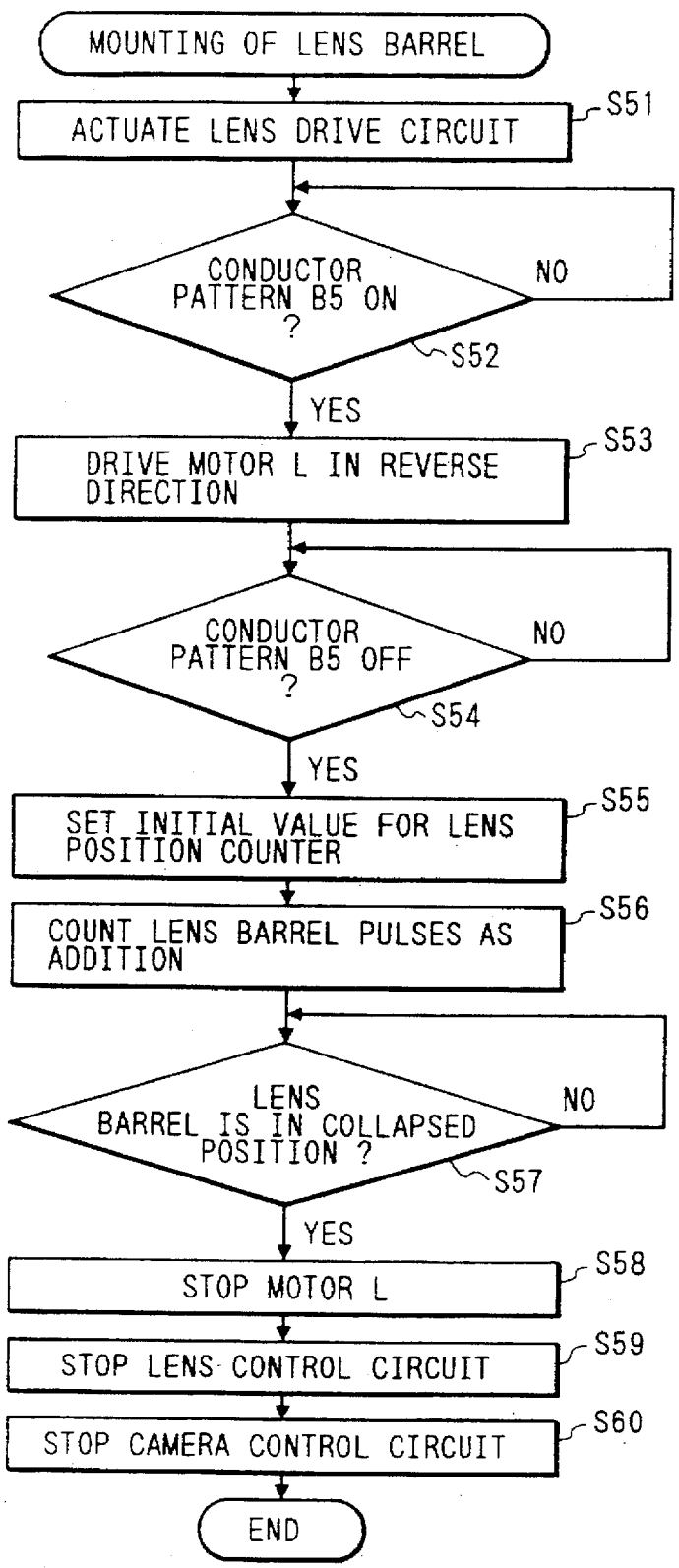
Figure 6:
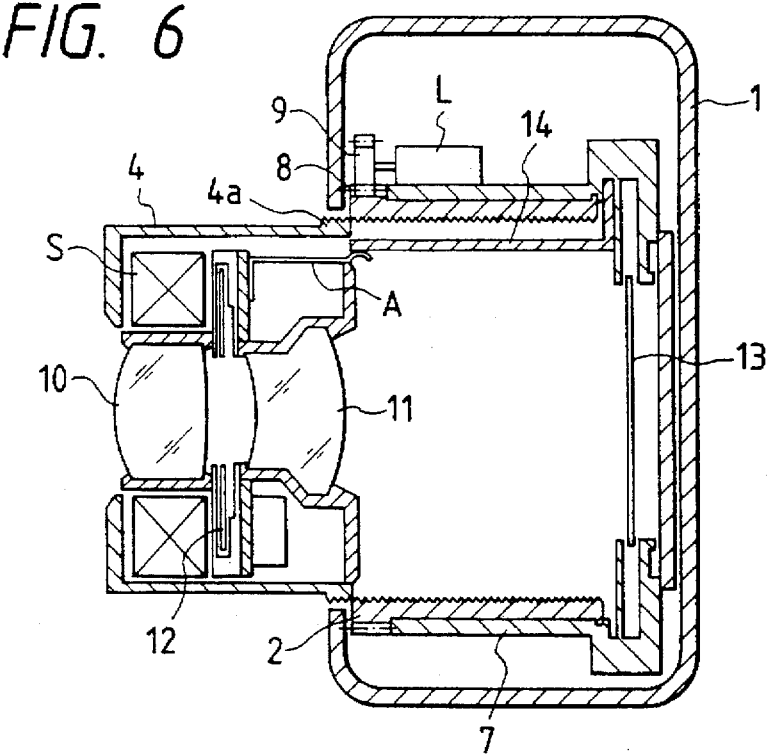

FIG. 5 is a flow chart to show an operation executed when the lens barrel 4 is mounted onto the camera body 1. When the fore end of the lens barrel 4 is being inserted into the mount portion 2 of the camera body 1, as shown in FIG. 6, the collector brushes A1, A2 first come into contact with the conductor patterns B1, B2 to cause a power source to be connected with the lens barrel 4, thereby actuating the lens control circuit 20. Then, a seizing signal of the lens control circuit 20 is transmitted through the collector brush A4 and the conductor pattern B4 to the camera control circuit 21 to actuate the camera control circuit 21 in a standby state (Step S51).

Then, the circuit is in an input wait state to wait for a signal appearing when the collector brush A5 contacts with the end edge B5c of the conductor pattern B5 (Step S52).

After that, when the contact signal is input, the motor L is driven in the reverse direction, i.e., rotated in the direction to move the lens barrel 4 to the collapsed position, and the lens barrel 4 is retracted into the mount portion 2 (Step S53).

Once the collector brush A5 passes through the end edge B5b of the conductor pattern B5, the position of the lens barrel 4 is controlled with a reference of that position thereafter (Step S54).

Then, a counter of position of the lens barrel 4 is initialized (Step S55).

Then, pulses generated with movement of the lens barrel 4 are counted while summed (Step S56).

After that, it is detected whether a count number of pulses reaches a predetermined number corresponding to the barrel collapsed position (Step S57).

The motor L is stopped when the pulse number reaches the predetermined number corresponding to the barrel collapsed position (Step S58).

After that, the lens control circuit 20 is stopped, to be set in a quiescent state (Step S59).

Then, the camera control circuit 21 is finally stopped, to be set in a quiescent state (Step S60).

FIG. 7 is a flow chart executed when the lens barrel 4 is dismounted from the camera body 1. The camera is first in an input wait state to wait for actuation of the lens barrel removing switch 22 through a push on the lens barrel removing button 6 (Step S71).

When the lens barrel removing switch 22 is turned on, the camera control circuit 20 and the lens control circuit 21 start driving the motor L in the normal direction (i.e., rotating the motor L to move the lens barrel 4 to the projected position) (Step S72).

When the conductor pattern B5 is brought into contact with the corresponding collector brush thereafter, it is recognized that the removed position of the lens barrel 4 is approaching (Step S73).

It is then detected that the removal of the lens barrel 4 is completed when the conductor pattern B5 is removed from contact with the corresponding collector brush (Step S74).

After that, the motor L is stopped (Step S75).

Then, the lens control circuit 20 is stopped, to be set in a quiescent state (Step S76).

Further, the camera control circuit 21 is finally stopped, to be set in a quiescent state (Step S77).

Figure 9:
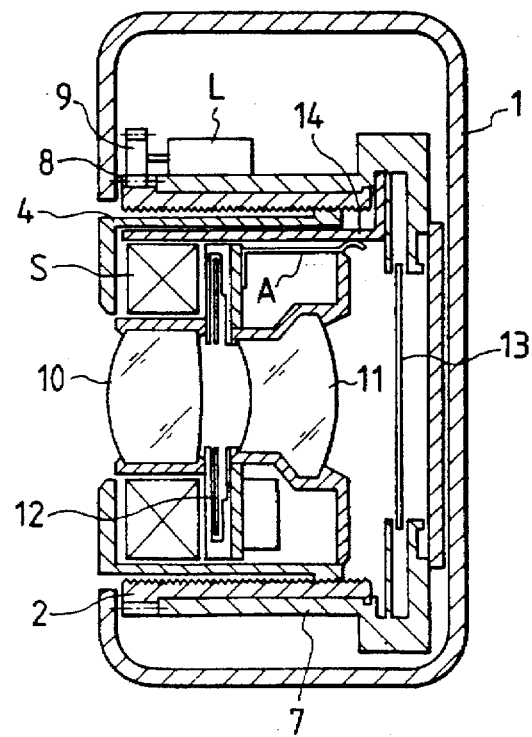
Figure 8:
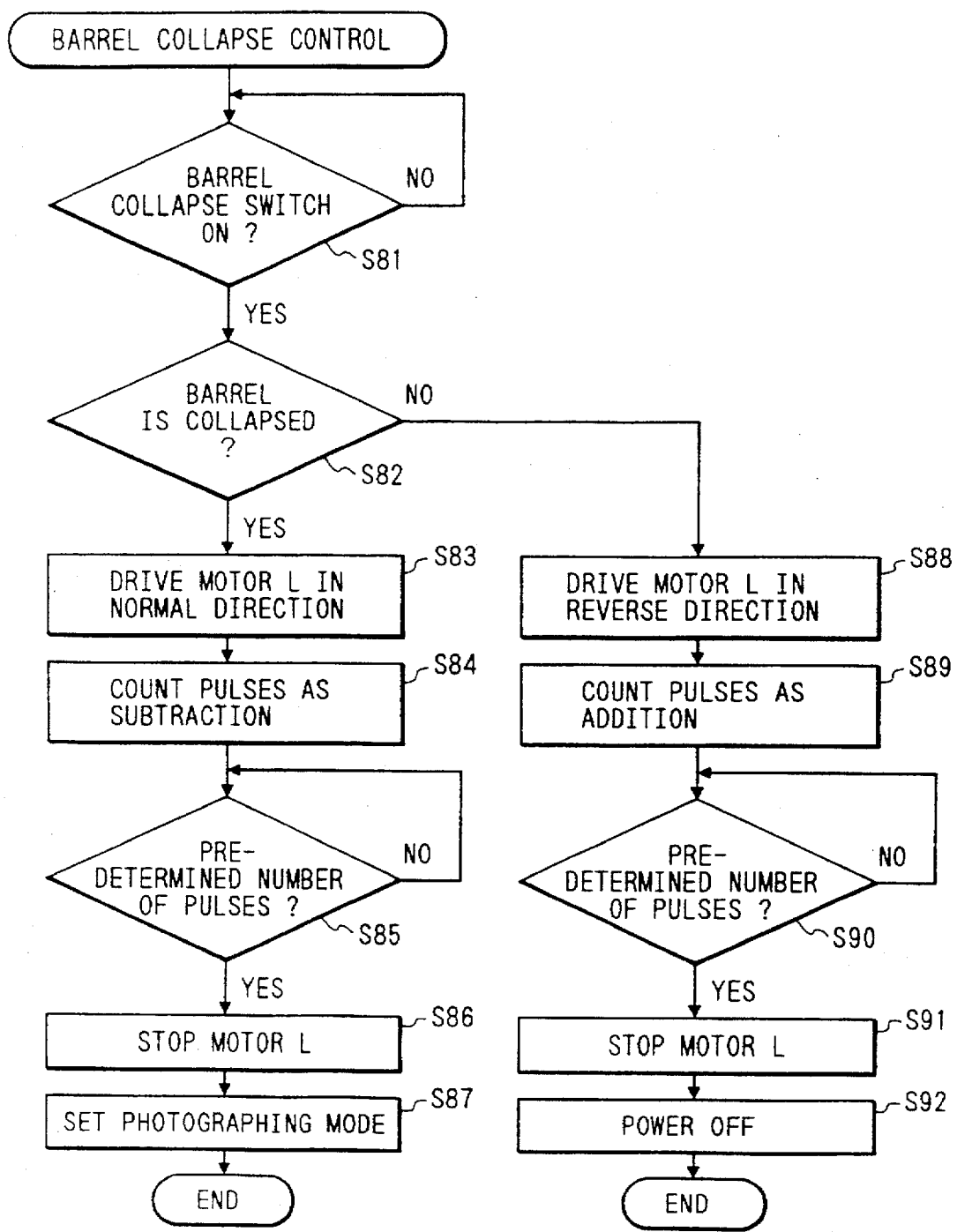

FIG. 8 is a flow chart executed when the lens barrel 4 is collapsed into the camera body. When the camera is unused, the lens barrel 4 is collapsed into the camera body as shown in FIG. 9, thus enhancing the portability thereof.

When the barrel collapse switch 23 is turned on by a push on the barrel collapse button 5, a barrel collapse operation is carried out if the lens barrel 4 is at the projected position, while a barrel projecting operation is carried out if the lens barrel is at the collapsed position (Step S81).

Then, the position of the lens barrel 4 is counted to check whether the lens barrel is collapsed or projected, with lens barrel pulses stored in a memory circuit (Step S82).

After that, if the lens barrel 4 is at the collapsed position, the motor L is driven in the normal direction, i.e., rotated to move the lens barrel 4 to the projected position, so as to take the lens barrel 4 to the projected position (Step S83).

Then, pulses are counted as subtracted (Step S84).

It is then checked whether the pulse count reaches a predetermined pulse number representing a photograph preparation position (Step S85).

Then, when the predetermined pulse number representing the photograph preparation position is reached, the motor L is stopped (Step S86).

A photograph mode is then set to prepare for photographing (Step S87).

On the other hand, if the lens barrel 4 is at the projected position at Step S82, the motor L is driven in the reverse direction to collapse the lens barrel 4 (Step S88).

After that, pulses are counted as added (Step S89).

Then, it is checked whether the pulse count reaches a predetermined pulse number representing the barrel collapsed position (Step S90).

Then, when the pulse count reaches the predetermined pulse number representing the barrel collapsed position, the motor L is stopped (Step S91).

The power source is finally turned off (Step S92).

Figure 10:
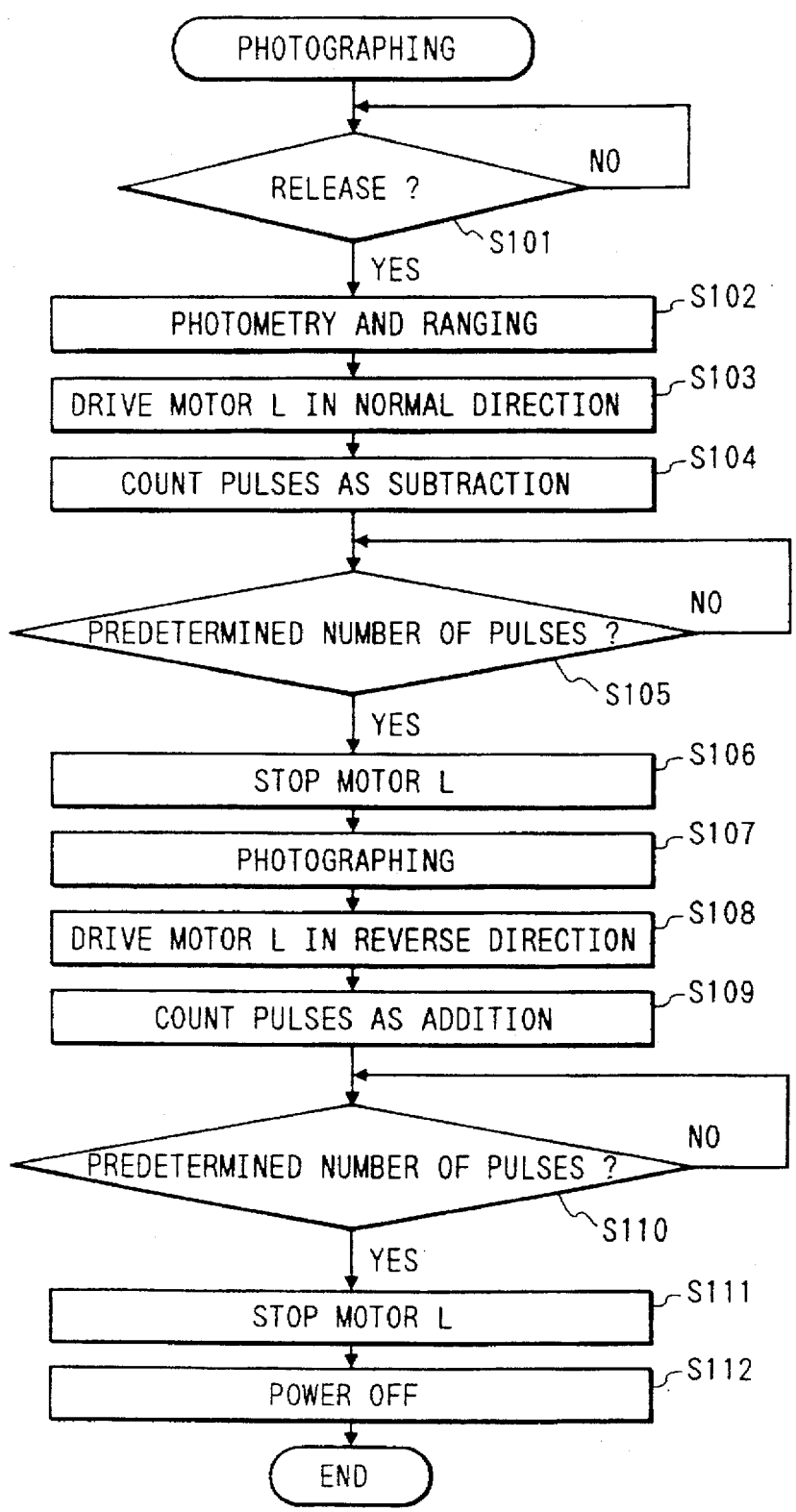

FIG. 10 is a flow chart of a photographing operation. The camera is first in a state to wait for a release signal (Step S101).

After the release signal is input, photometry (exposure measurement) and ranging (distance measurement) are carried out (Step S102).

After that, the motor L is driven in the normal direction (or rotated to move the lens barrel 4 to the projected position) to take the lens barrel 4 to the projected position (Step S103).

After that, pulses are counted as subtracted (Step S104).

The lens barrel 4 is moved toward the barrel projected position until a pulse number corresponding to a value of the distance measured is counted (Step S105).

The predetermined pulse value is set as a positive value which can keep the collector brush A5 from contacting the end edge B5b of the conductor pattern B5.

Then, when the pulse count reaches the predetermined pulse value, the motor L is stopped (Step S106).

A photograph is then taken (Step S107).

After completion of photographing, a reverse operation from Step S106 to Step S103 is executed to return the lens barrel 4 to the initial position (Steps S108, S109, S110, S111).

The power source is then turned off (Step S112).

In the camera as arranged as above, when the lens barrel 4 is moved to the projected position or to the collapsed position, the limit of movement of the lens barrel 4 is set by controlling the drive of the motor L by an electric signal, thereby preventing a drop of the lens barrel 4 out of the camera body. This permits a single mechanism for mounting or dismounting the lens barrel to perform the projecting or collapsing operation of the lens barrel as well. In other words, there is no special lens barrel mount member required.

When the lens barrel 4 is being mounted or dismounted, the drive limit of the motor L is removed by an electric signal, so as to remove the limit of movement of the lens barrel, remarkably facilitating the lens exchange.

Next explained is an embodiment of the signal transmission apparatus according to the present invention.

Figure 11:
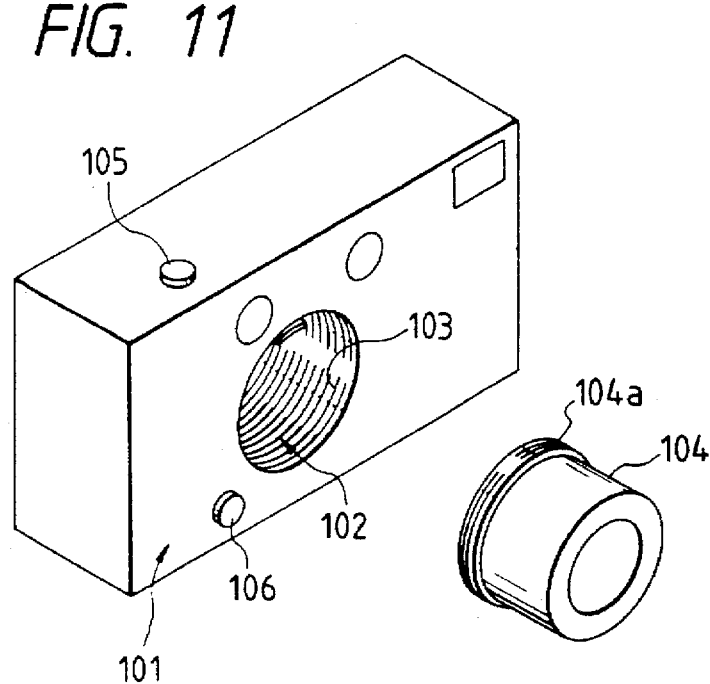

FIG. 11 shows a camera provided with an embodiment of the signal transmission apparatus according to the present invention. In FIG. 11, reference numeral 101 designates a camera body.

A mount portion 102 is formed substantially in the center of the camera body 101, and a female screw 103 is formed on the mount portion 102.

Numeral 104 denotes a lens barrel of an interchangeable lens, and a male mount portion 104a engageable in mesh with the mount portion 102 is formed on the lens barrel 104.

A barrel collapse button 105 is provided on the upper surface of the camera body 101, and the lens barrel 104 alternately takes a projected position, or a retracted or collapsed position at each push of the barrel collapse button 105.

A lens barrel removing button 106 is provided on the front surface of the camera body 101, and the lens barrel 104 is removed from the camera body 101 when the lens barrel removing button 106 is pushed.

Figure 12:
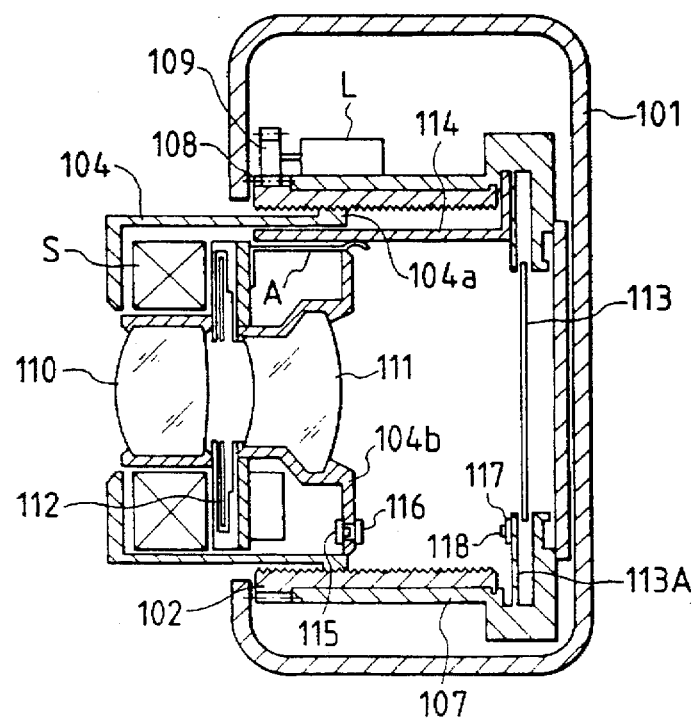

FIG. 12 shows a cross section of the camera in which the lens barrel 104 is mounted on the mount portion 102 of the camera body 101, and which is in a state to take a photograph. In FIG. 12, a cylindrical support member 107 is provided in the camera body 101.

The mount portion 102 is fit as rotatable in the support member 107.

A gear 108 is formed on an outer periphery of the mount portion 102 on the subject side, and a gear 109 of a motor L meshes with the gear 108. The male mount portion 104a of the lens barrel 104 engages in mesh with the mount portion 102, and photo-taking lenses 110, 111 are located inside the lens barrel 104.

Further, a motor S is situated for driving a stop 112 on the subject side of the lens barrel 104. A focal plane shutter 113 is positioned on support member 107 on the side opposite to the subject side. The focal plane shutter 113 will be a light shielding device closed upon exchange of the lens barrel 104 in the case that the lens shutter is provided in the lens barrel 104. An end of a key 114 is fixed on the support member 107 on the focal plane shutter 113 side. The key 114 is inserted into the lens barrel 104 to guide translation of the lens barrel 104.

Moreover, electric conductor patterns B as detailed below are formed on the key 114, and collector brushes A as also described below are in contact with the electric conductor patterns B.

In this embodiment, a light emitting element 115 is located on a back surface 104b of the lens barrel 104, and a light receiving element 116 is also located on the back surface 104b further on that side of the drawing with respect to the light emitting element 115.

A light receiving element 117 is located on the from surface of the support frame 113A of the focal plane shutter 113, and a light emitting element 118 is also located there further on that side of the drawing with respect to the light receiving element 117. The light emitting element 115 and the light receiving element 117 are disposed to face each other along the axial direction of the lens barrel, which can conduct stable communication irrespective of the position of the lens barrel. The light emitting element 118 and the light receiving element 116 are disposed in the same manner as the elements 115, 117.

Each of the light emitting elements 115, 118 may be, for example, a light emitting diode (LED) emitting infrared light off the range of film sensitive wavelengths. Further, each of the light receiving elements 116, 117 may be, for example, a silicon photodiode (SPD).

Figure 13:
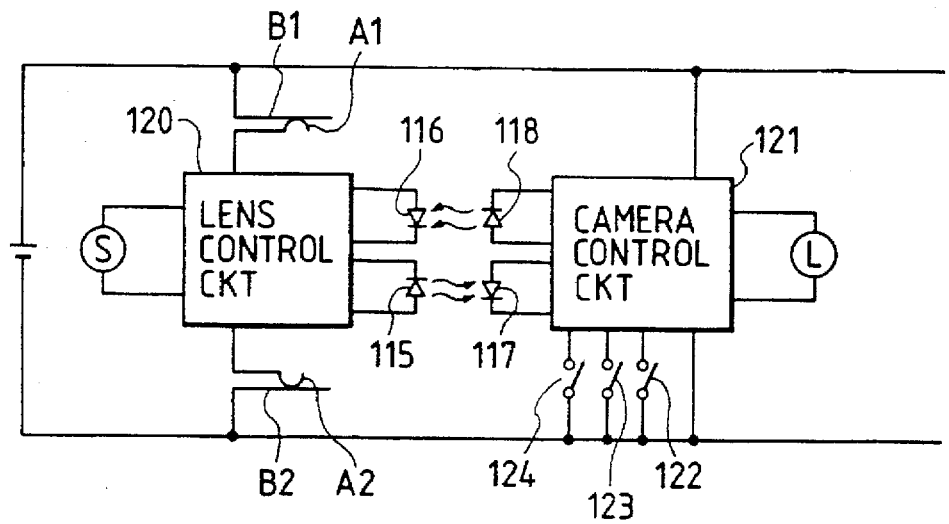

FIG. 13 is a block diagram to show circuits in the camera of this embodiment, in which numeral 120 denotes a lens control circuit and numeral 121 a camera control circuit. The lens control circuit 120 executes a control of the motor S for driving the stop 112, the shutter, and the like provided in the lens barrel 104, data processing of detection signals of positions of the stop 112 and the shutter, and data communication with the camera control circuit 121.

The camera control circuit 121 executes signal processing of signals given from the lens barrel 104, communication with the lens control circuit 120, control and signal processing of the motor L for driving the lens barrel 104 in the camera, a film feed motor, and the like.

In this embodiment, the light emitting element 115 and the light receiving element 116 are connected to the lens control circuit 120, and the light emitting element 118 and the light receiving element 117 are connected to the camera control circuit 121, thereby performing data communication between the lens control circuit 120 and the camera control circuit 121, for example, data communications for stop control, for focus control, and the like.

In detail, for example, an aperture stop drive member and a lens drive member on the lens barrel 104 side are controlled through the lens control circuit 120, based on an aperture stop value and a focus value, respectively, calculated in the camera control circuit 121.

Then, the control results are transmitted to the camera control circuit 121, so that the camera control circuit 121 may check whether correct controls are carried out.

In the case of a zoom lens, an f-number at full open aperture, a focal length, and the like are transmitted from the lens control circuit 120 to the camera control circuit 121.

A discrimination of plural data, that is, a discrimination of whether the infrared light emitted from the light emitting element 115 includes the stop control information or the focus control information, may be achieved by employing infrared light beams having wavelengths different from each other.

In such an arrangement, the light receiving element 116 should be structured to be able to discriminate the wavelengths of infrared light beams emitted, for example, to which an optical fiber device may be applicable.

Alternatively, a plurality of light emitting elements, which can emit respective infrared light beams having wavelengths different from each other, and a plurality of light receiving elements, which can receive the respective infrared light beams, may be employed for respective data.

Further, a control amount of data may be determined, for example, by detecting an intensity (emitted light amount) of infrared light.

Collector brushes A1, A2 are connected to the lens control circuit 120, and these collector brushes A1, A2, are capable of contact with conductor patterns B1, B2, respectively, formed on the key 114. The details are described later.

A lens barrel removing switch 122 is turned on or off with a push on the lens barrel removing button 106 as shown in FIG. 11. When the lens barrel removing switch 122 is turned on, the motor L is driven to remove the lens barrel 104 from the camera body 101.

A barrel collapse switch 123 is turned on or off with a push on the barrel collapse button 105 as shown in FIG. 11. When the barrel collapse switch 123 is turned on, the lens 104 is collapsed into the camera body.

A lens position detection switch 124 detects a mount condition of the lens barrel 104 on the camera body 101. The details thereon will be described later.

Figure 14:
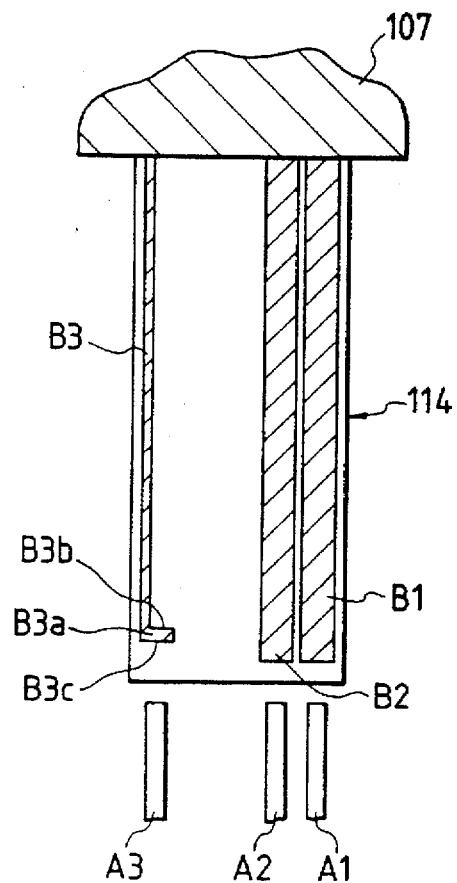

FIG. 14 shows the conductor patterns B1, B2, B3 formed on the key 114, which are formed such that when the lens barrel 104 is being inserted into the mount portion 102, the collector brushes A1, A2, A3 come into contact with the conductor patterns B1, B2, B3, respectively.

The conductor pattern B3 and the collector brush A3 constitute the aforementioned lens position detection switch 124.

When the lens barrel is being inserted into the mount portion, the conductor patterns B1, B2 are first electrically connected to the collector brushes A1, A2 before the conductor pattern B3 is electrically connected to the collector brush A3. Thus, when the end portion of the lens barrel 104 is being inserted into the mount portion 102, the motor L is kept undriven and only the lens control circuit 120 is actuated at the first stage.

After that, an end B3a of the conductor pattern B3 comes into contact with the collector brush A3 to drive the motor L, whereby the mount portion 102 is rotated to set the lens barrel 104 in the mount portion 102.

The end B3a of the conductor pattern B3 is a portion for reading a position of the lens barrel 104 relative to the mount portion 102, and when the lens barrel 104 is collapsed into the mount portion 102, the collector brush A3 becomes off from an end edge B3b of the conductor pattern B3.

The position where the collector brush A3 becomes off from the end edge B3b is defined as a start position, and pulse signals in synchronism with rotation of the motor L are counted from the start position, whereby a position of the lens barrel 104 is detected for position control.

Operations of the camera as described will be explained in detail with flow charts.

Figure 15:
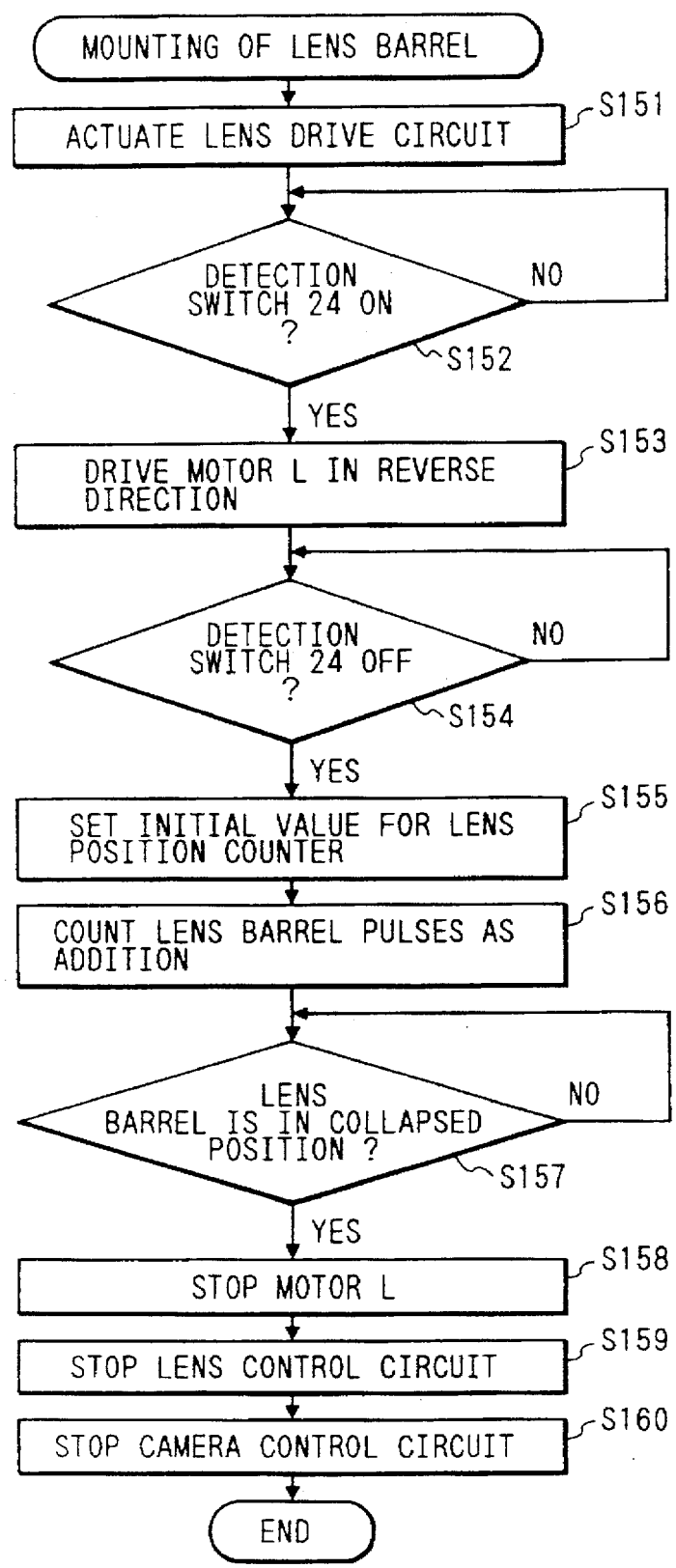
Figure 16:
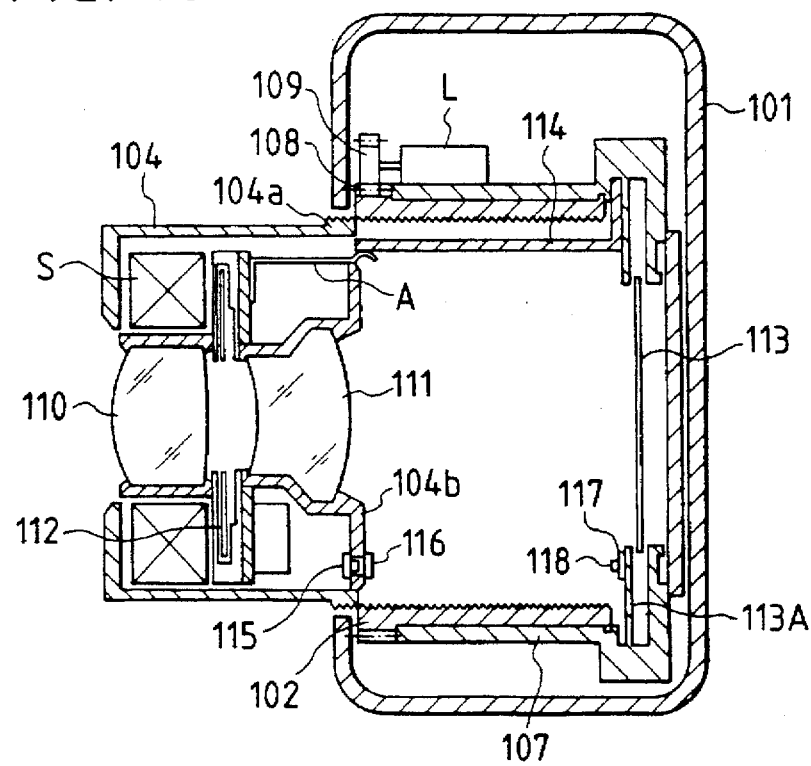

FIG. 15 is a flow chart to show an operation executed when the lens barrel 104 is mounted onto the camera body 101. When the fore end of the lens barrel 104 is being inserted into the mount portion 102 of the camera body 101, as shown in FIG. 16, the collector brushes A1, A2 first come into contact with the conductor patterns B1, B2 to cause a power source to be connected with the lens barrel 104, thereby actuating the lens control circuit 120. Then, a seizing signal of the lens control circuit 120 is transmitted through the light emitting element 115 and the light receiving element 117 to the camera control circuit 121 to actuate the camera control circuit 121 in a standby state (Step S151).

Then, the circuit is in an input wait state to wait for a signal appearing when the collector brush A3 contacts with the end edge B3c of the conductor pattern B3 in the lens position detection switch 124 (Step S152).

After that, when the contact makes the lens position detection switch 124 turn on to cause a signal to be input, the motor L is driven in the reverse direction, i.e., rotated in the direction to move the lens barrel 104 to the collapsed position, and the lens barrel 104 is retracted into the mount portion 102 (Step S153).

Once the collector brush A3 passes through the end edge B3b of the conductor pattern B3, the lens position detection switch 124 is turned off, and the position of the lens barrel 104 is controlled with a reference of that position thereafter (Step S154).

Then, a counter of position of the lens barrel 104 is initialized (Step S155).

Then, pulses generated with movement of the lens barrel 104 are counted while summed (Step S156).

After that, it is detected whether a count number of pulses reaches a predetermined number corresponding to the barrel collapsed position (Step S157).

The motor L is stopped when the pulse number reaches the predetermined number corresponding to the barrel collapsed position (Step S158).

After that, the lens control circuit 120 is stopped, to be set in a quiescent state (Step S159).

Then, the camera control circuit 121 is finally stopped, to be set in a quiescent state (Step S160).

Figure 17:
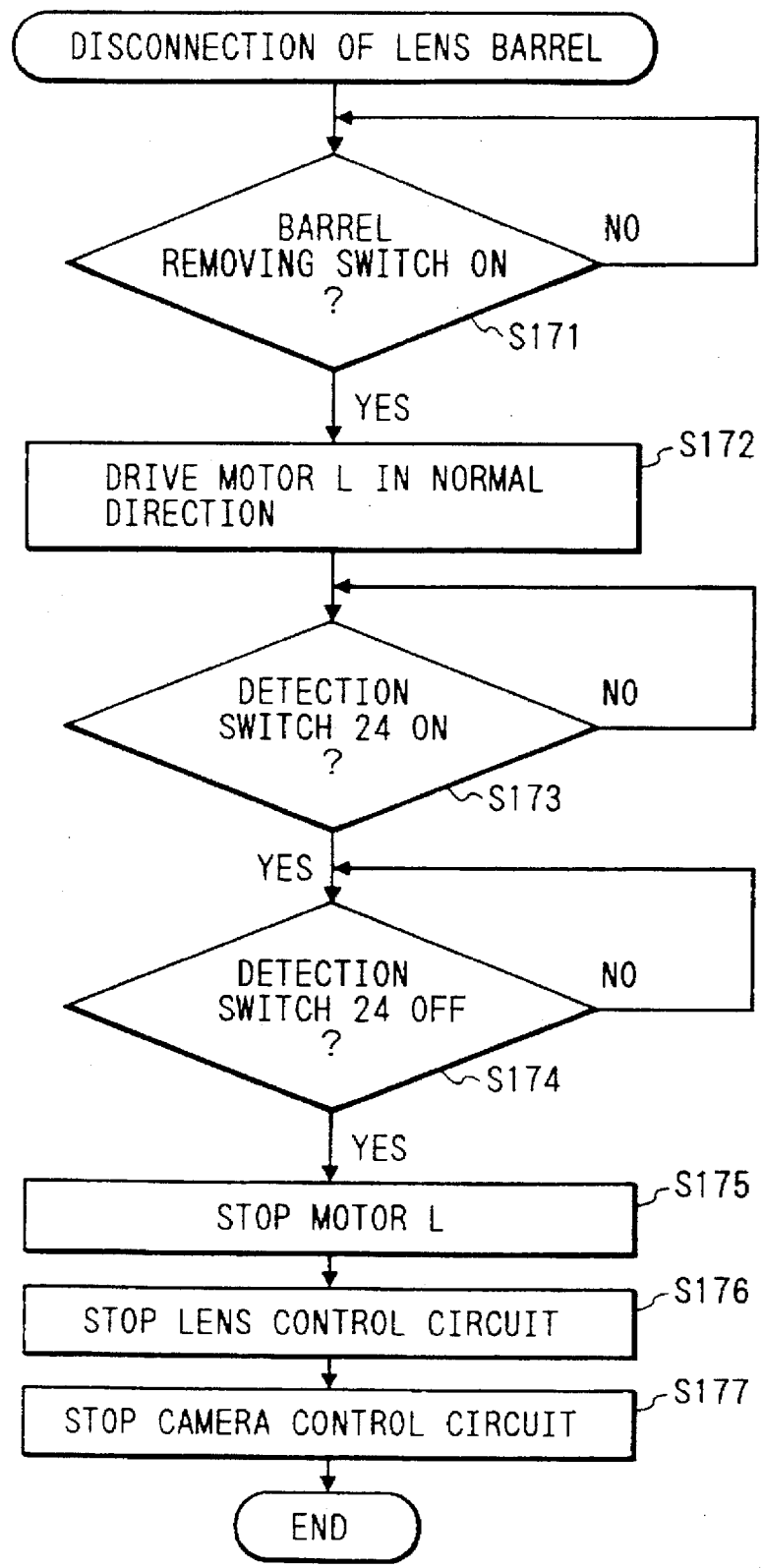

FIG. 17 is a flow chart executed when the lens barrel 104 is dismounted from the camera body 101. The camera is first in an input wait state to wait for actuation of the lens barrel removing switch 122 through a push on the lens barrel removing button 106 (Step S171).

When the lens barrel removing switch 122 is turned on, the camera control circuit 120 and the lens control circuit 121 start driving the motor L in the normal direction (i.e., rotating the motor L to move the lens barrel 104 to the projected position) (Step S172).

When the collector brush A3 comes into contact with the conductor pattern B3 to make the lens position detection switch 124 turn on thereafter, it is recognized that the removed position of the lens barrel 104 is approaching (Step S173).

It is then detected that the removal of the lens barrel 104 is completed when the collector brush A3 comes apart from the conductor pattern B3 to make the lens position detection switch 124 again turned off (Step S174).

After that, the motor L is stopped (Step S175).

Then, the lens control circuit 120 is stopped, to be set in a quiescent state (Step S176).

Further the camera control circuit 121 is finally stopped, to be set in a quiescent state (Step S177).

Figure 19:
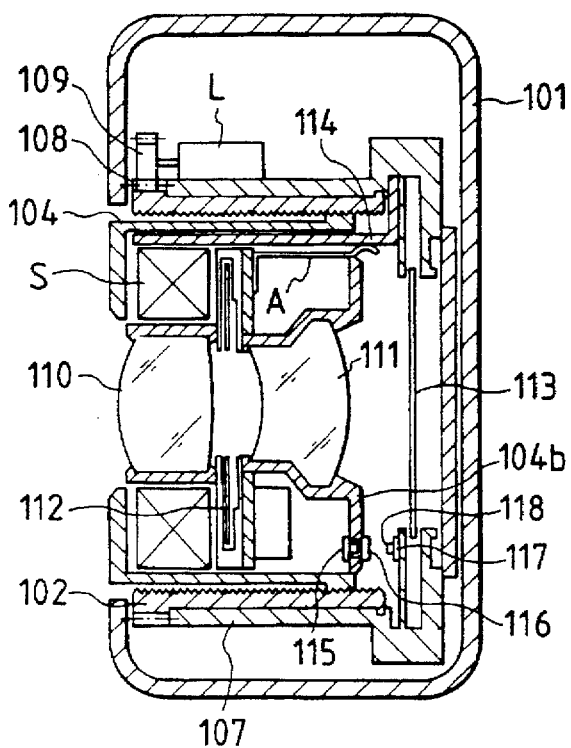
Figure 18:
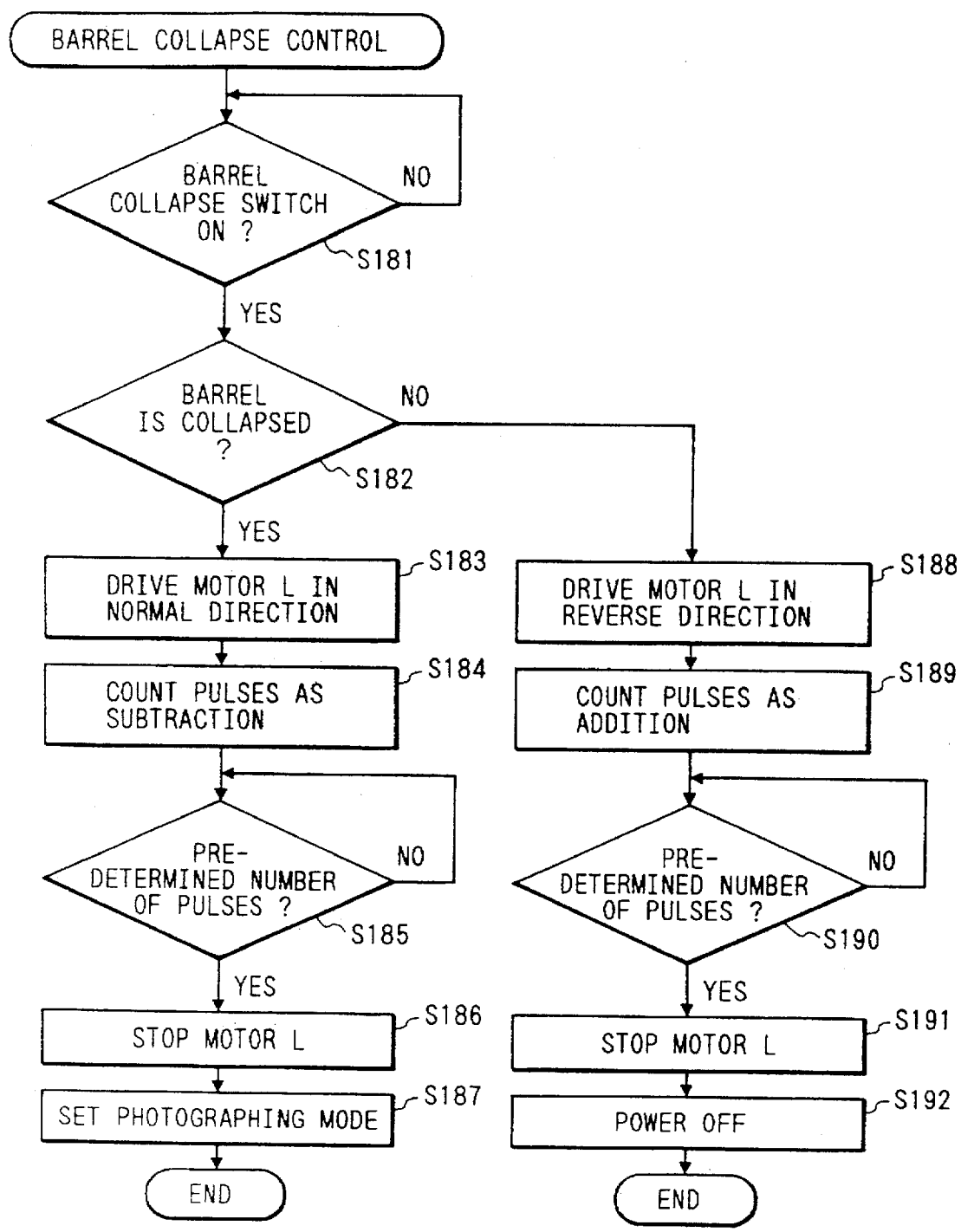

FIG. 18 is a flow chart executed when the lens barrel 104 is collapsed into the camera body. When the camera is unused, the lens barrel 104 is collapsed into the camera body as shown in FIG. 19, thereby enhancing the portability thereof.

When the barrel collapse switch 123 is turned on by a push on the barrel collapse button 105, a barrel collapse operation is carried out if the lens barrel 104 is at the projected position, while a barrel projecting operation is carried out if the lens barrel is at the collapsed position (Step S181).

Then, the position of the lens barrel 104 is counted to check whether the lens barrel is collapsed or projected, with lens barrel pulses stored in a memory circuit (Step S182).

After that, if the lens barrel 104 is at the collapsed position, the motor L is driven in the normal direction, i.e., rotated to move the lens barrel 104 to the projected position, so as to take the lens barrel 104 to the projected position (Step S183).

Then, pulses are counted as subtracted (Step S184).

It is then checked whether the pulse count reaches a predetermined pulse number representing a photograph preparation position (Step S185).

Then, when the predetermined pulse number representing the photographed preparation position is reached, the motor L is stopped (Step S186).

A photograph mode is then set to prepare for photographing (Step S187).

On the other hand, if the lens barrel 104 is at the projected position at Step S182, the motor L is driven in the reverse direction to collapse the lens barrel 104 (Step S188).

After that, pulses are counted as added (Step S189).

Then, it is checked whether the pulse count reaches a predetermined pulse number representing the barrel collapsed position (Step S190).

Then, when the pulse count reaches the predetermined pulse number representing the barrel collapsed position, the motor L is stopped (Step S191).

The power source is finally turned off (Step S192).

The operation of photographing with the camera of this embodiment is the same as that in the first embodiment as described with FIG. 10, and, therefore, the description thereof is omitted to explain here.

In the signal transmission apparatus for the camera as so arranged, the light emitting element 115 and the light receiving element 116 are located on the lens barrel 104 side, and the light receiving element 117 and the light emitting element 118 are located on the camera body 101 side, so that the signal transmission is performed through the light emitting elements 115, 118 and the light receiving elements 116, 117 between the lens control means 120 located on the lens barrel 104 side and the camera control means 121 located on the camera body 101 side. As a result, sure signal transmission may be assured between the lens control circuit 120 and the camera control circuit 121 in such a simple structure.

Figure 20:
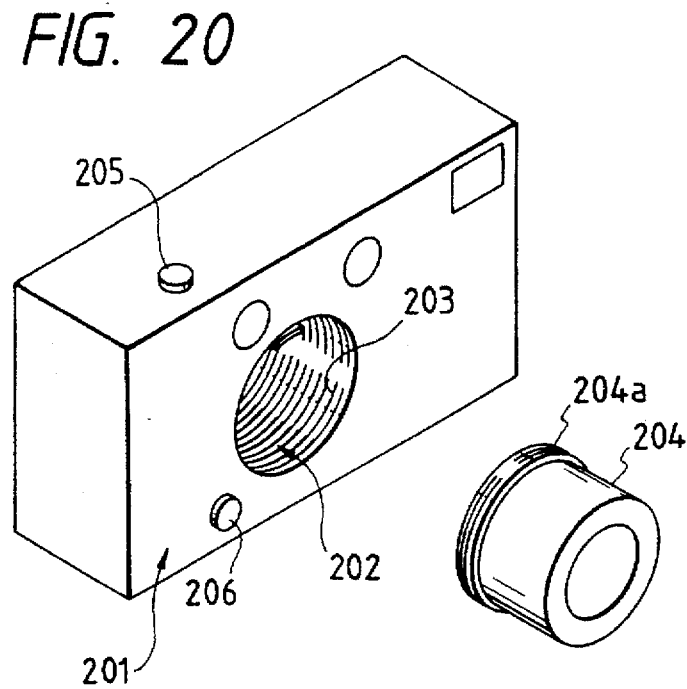

FIG. 20 shows a third embodiment of a camera provided with a signal transmission apparatus according to the present invention. In FIG. 20, reference numeral 201 designates a camera body.

A mount portion 202 is formed substantially in the center of the camera body 201, and a female screw 203 is formed on the mount portion 202.

Numeral 204 denotes a lens barrel of an interchangeable lens, and a male mount portion 204a engageable in mesh with the mount portion 202 is formed on the lens barrel 204.

A barrel collapse button 205 is provided on the upper surface of the camera body 201, and the lens barrel 204 alternately takes a projected position, or a retracted or collapsed position at each push of the barrel collapse button 205.

A lens barrel removing button 206 is provided on the front surface of the camera body 201, and the lens barrel 204 is removed from the camera body 201 when the lens barrel removing button 206 is pushed.

Figure 21:
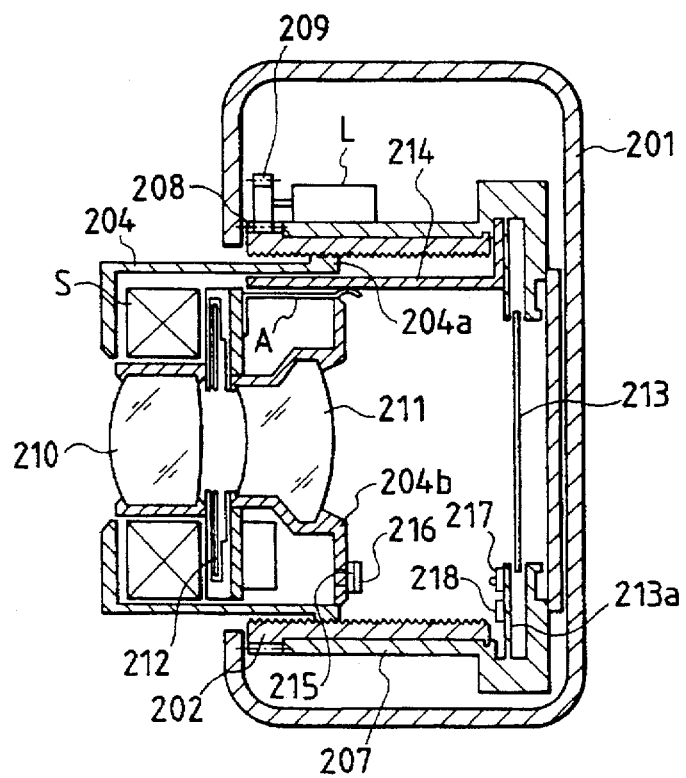

FIG. 21 shows a cross section of the camera in which the lens barrel 204 is mounted on the mount portion 202 of the camera body 201, and which is in a state to take a photograph. In FIG. 21, a cylindrical support member 207 is provided in the camera body 201.

The mount portion 202 is fit as rotatable in the support member 207.

A gear 208 is formed on outer periphery of the mount portion 202 on the subject side, and a gear 209 of a motor L meshes with the gear 208.

The male mount portion 204a of the lens barrel 204 engages in mesh with the mount portion 202, and phototaking lenses 210, 211 are located inside the lens barrel 204.

Further, a motor S is situated for driving a stop 212 on the subject side of the lens barrel 204.

A focal plane shutter 213 is positioned on the support member 207 on the side opposite to the subject side. The focal plane shutter 213 is a light shielding device closed upon exchange of the lens barrel 204 in the case that the lens shutter is provided in the lens barrel 204. An end of a key 214 is fixed on the support member 207 on the focal plane shutter 213 side. The key 214 is inserted into the lens barrel 204 to guide translation of the lens barrel 204.

Moreover, electric conductor patterns B as detailed below are formed on the key 214, and collector brushes A as also described below are in contact with the electric conductor patterns B.

In this embodiment, a light receiving element 215 is located on the back surface 204b of the lens barrel 204. A half-mirror 216 is provided in front of the light receiving element 215. The half-mirror 216 transmits a portion of the light from a light emitting element (explained later) and reflects a remaining portion of the light. A light emitting element 217 is located on a support frame 213a of the focal plane shutter 213. Located under the light emitting element 217 is a light receiving element 218. The light emitting element 217 and the light receiving element 215 are disposed to face each other along the axial direction of the lens barrel so that they can effect stable communication irrespective of the position of the lens barrel.

A portion of the light emitted by the light emitting element 217 is reflected by the half-mirror 216 so as to be incident on the light receiving element 218, thus the position of the lens barrel 204 is detected on the principle of trigonometrical survey.

The light emitting element 217 may be, for example, a light emitting diode (LED) emitting infrared light off the range of film sensitive wavelengths. Further, the light receiving element 215 used for communication may be, for example, a silicon photodiode (SPD). The light receiving element 218 used for position detection may be a position sensing device (PSD) comprising a multi-division silicon photodiode.

Figure 22:
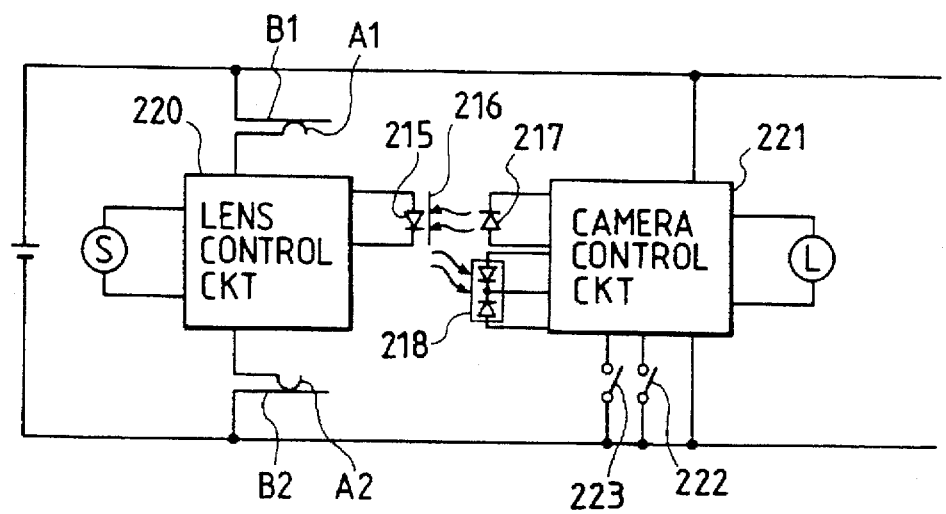

FIG. 22 is a block diagram of the camera of this embodiment, in which numeral 220 denotes a lens control circuit and numeral 221 a camera control circuit.

The lens control circuit 220 executes a control of the motor S for driving the stop 112, the shutter, etc., provided in the lens barrel 204, data processing of detection signal of positions of the stop 112 and the shutter, and data communication with the camera control circuit.

The camera control circuit 221 executes data communication with the lens control circuit 220, calculation processing of the lens barrel position detection, control and signal processing of a motor L for driving the lens barrel 204 and a motor for film feeding, etc., on the camera side.

In this embodiment, the light receiving element 215 is connected to the lens control circuit 220, while light emitting element 217 and the light receiving element 218 for receiving the light reflected by the half-mirror 216 are connected to the camera control circuit, so that data communication, e.g., data communication for stop control and focus control, is conducted between the lens control circuit 220 and the camera control circuit 221 as well as the detection of the position of the lens barrel 204.

Specifically, for example, a stop value and a focus value calculated by the camera control circuit 221 are communicated to the lens control circuit 220 via the light emitting element 217 on the camera side and the light receiving element 215 on the lens barrel side, so that lens control circuit 220 controls a driving member for the stop and a driving member for the lens on the basis of those calculated values.

A discrimination of plural data, i.e., a discrimination of whether the infrared light emitted from the element 217 includes the stop control information or the focus control information, can be attained by using infrared light of different wavelengths. In that case, the light receiving element 215 is constructed, as a matter of course, such that it can discriminate what wavelength of the infrared light is emitted. Such a light receiving element may be constructed utilizing an optical fiber element or the like. Alternatively, a plurality of light emitting elements, which can emit infrared light of wavelength different from each other, and a plurality of light receiving elements receiving the respective infrared light may be employed for respective data.

Control amount of data may be determined in accordance with the intensity (or emitted light amount) of the infrared light.

On the other hand, the position of the lens barrel 204 with respect to the camera body is detected by using the light emitting element 217, light receiving element 218 and the half-mirror 216 on the barrel side. In this regard, a mirror (or reflection member) on another surface may be substituted for the half-mirror on the lens barrel 204.

Collector brushes A1, A2 are connected to the lens control circuit 220, and these collector brushes A1, A2 are capable of contacting with conductor patterns B1, B2 respectively, formed on the key 214. The details are described later.

A lens barrel removing switch 222 is turned on and off with a push on the lens barrel removing button 206 as shown in FIG. 20. When the lens barrel removing switch 222 is turned on, the motor L is driven to remove the lens barrel 204 from the camera body 201.

A barrel collapse switch 223 is turned on and off with a push on the barrel collapse button 205 as shown in FIG. 20.

Figure 23:
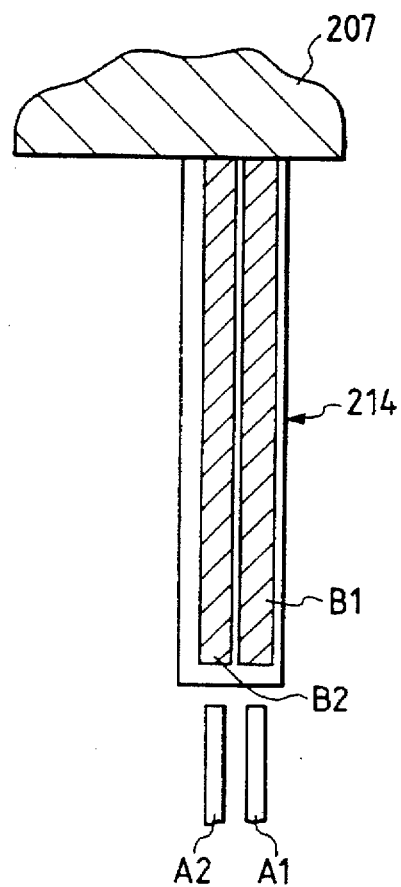

When the barrel collapse switch 223 is turned on, the lens barrel 204 is collapsed into the camera body 201. FIG. 23 shows the conductor patterns B1, B2 formed on the key 214, which are formed such that when lens barrel 204 is inserted into the mount portion 202, the collector brushes A1, A2 contact with the conductor patterns B1, B2 respectively.

When the end of the lens barrel 204 is inserted into the mount portion 202, the conductor patterns B1, B2 come in contact with the collector brushes A1, A2, respectively, so that the lens control circuit 220 is actuated. Then, the infrared light is emitted from the light emitting element 217 which is connected to the camera control circuit 221. The reflection light from the half-mirror 216 is detected by light receiving element 218 so that the position of the lens barrel 204 is calculated.

When the result of the calculation shows that the lens barrel is in a mounting position, the motor L is actuated to control the position of the lens barrel 204.

In the following, the operation of the above-described camera will be explained with reference to flow charts.

Figure 24:
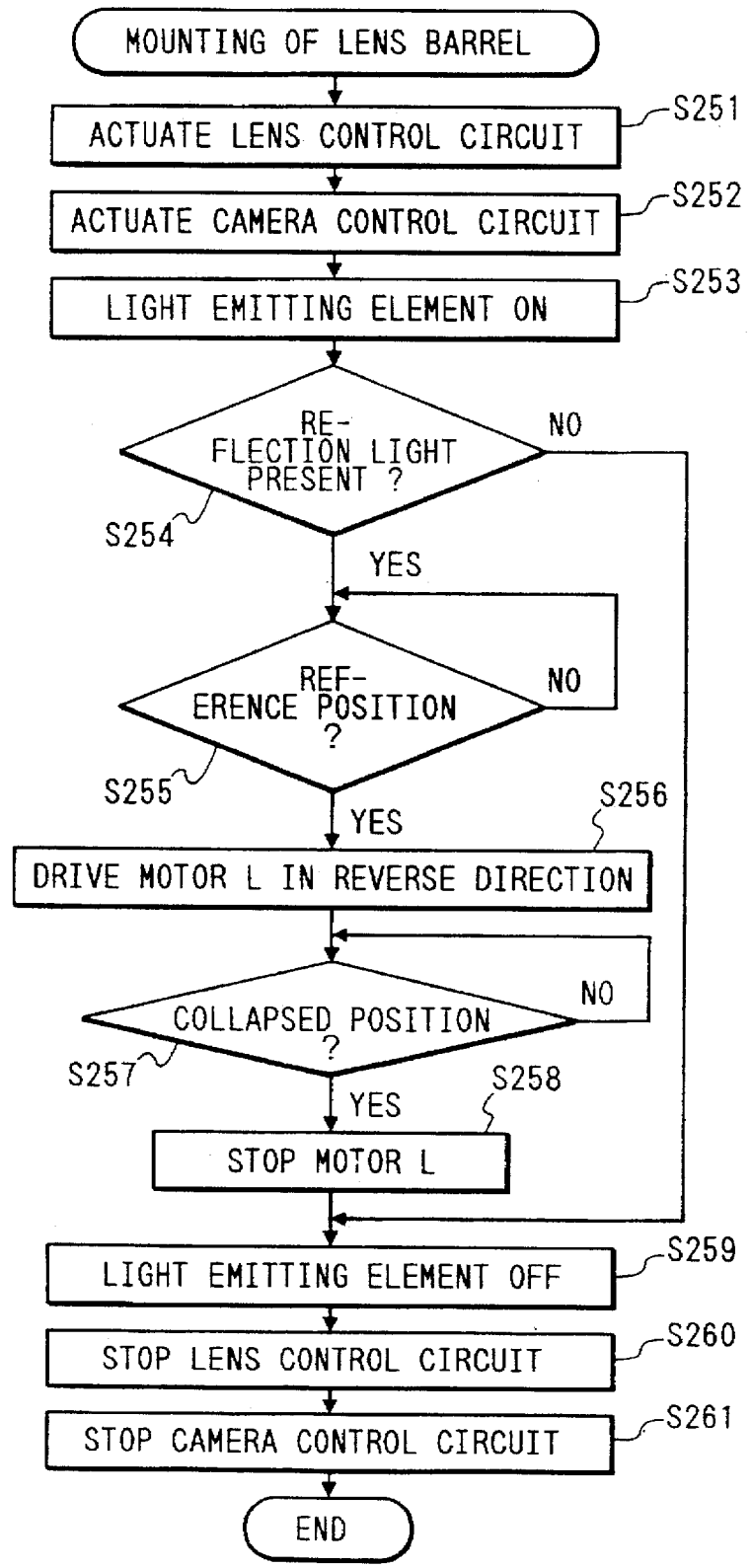
Figure 25:
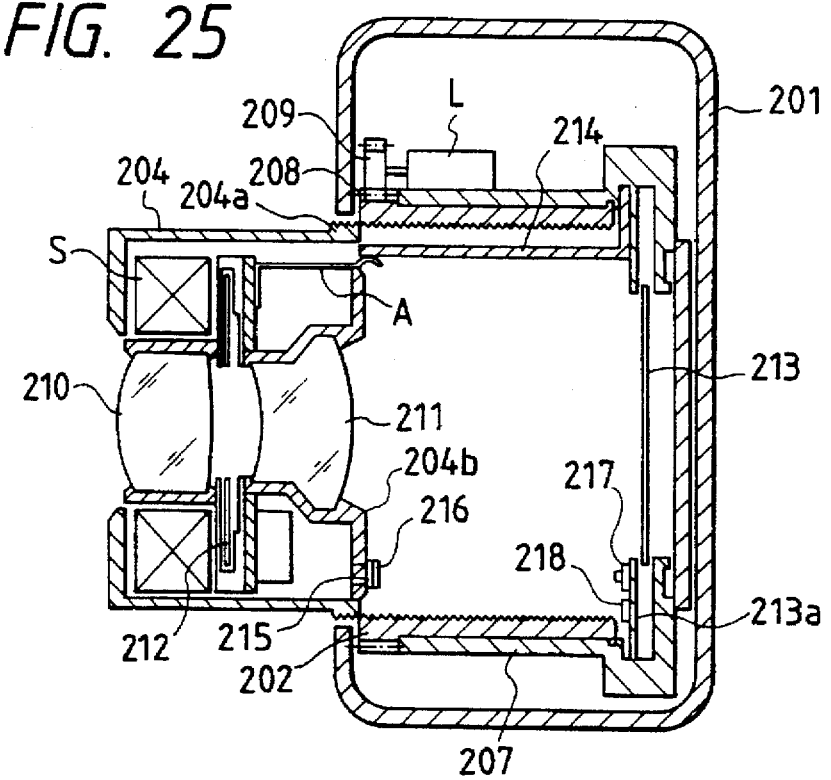

FIG. 24 is a flow chart to show an operation executed when the lens barrel 204 is mounted onto the camera body 201. At first, when the end of the lens barrel 204 is being inserted into the mount portion 202 of the camera body 201, as shown in FIG. 25, the collector brushes A1, A2 come into contact with the conductor patterns B1, B2 to cause a power source to be connected with the lens barrel 204, thereby actuating the lens control circuit 220 (Step S251).

Then, upon detection of the actuation of the lens control circuit 220, the camera control circuit 221 is actuated (Step S252).

When the camera control circuit 221 is actuated, the light emitting element 217 is turned on so that the infrared light is emitted (Step S253).

After that, it is determined whether reflection light is incident on the light receiving element 218 (Step S254).

If the reflection light is not detected, it is determined that the lens barrel is not in a mounting position, so that the process proceeds to Step S259, while if the reflection light is detected, the process proceeds to Step S255.

When the reflection light is detected, the position of the lens barrel 204 is calculated based on the incident position on the light receiving element 218 of the reflection light so as to determine whether the lens barrel is in the reference mounting position or not (Step S255).

If the lens barrel 204 is in the reference position, the motor L is driven in the reverse direction, i.e., rotated in the direction to move the lens barrel 204 to the collapsed position, and the lens barrel 204 is retracted into the mount portion 202 (Step S256).

And then, a calculation based on an output of the light receiving element 218 is executed so as to determine whether the lens barrel 204 reaches its collapsed position (Step S257).

When the lens barrel 204 reaches the collapsed position, the motor L is stopped (Step S258).

Then the light emitting element 217 is turned off (Step S259).

After that, the lens control circuit 220 is stopped to be in a rest state (Step S260).

And then the camera control circuit 221 is stopped to be in a rest state (Step S261).

Figure 26:
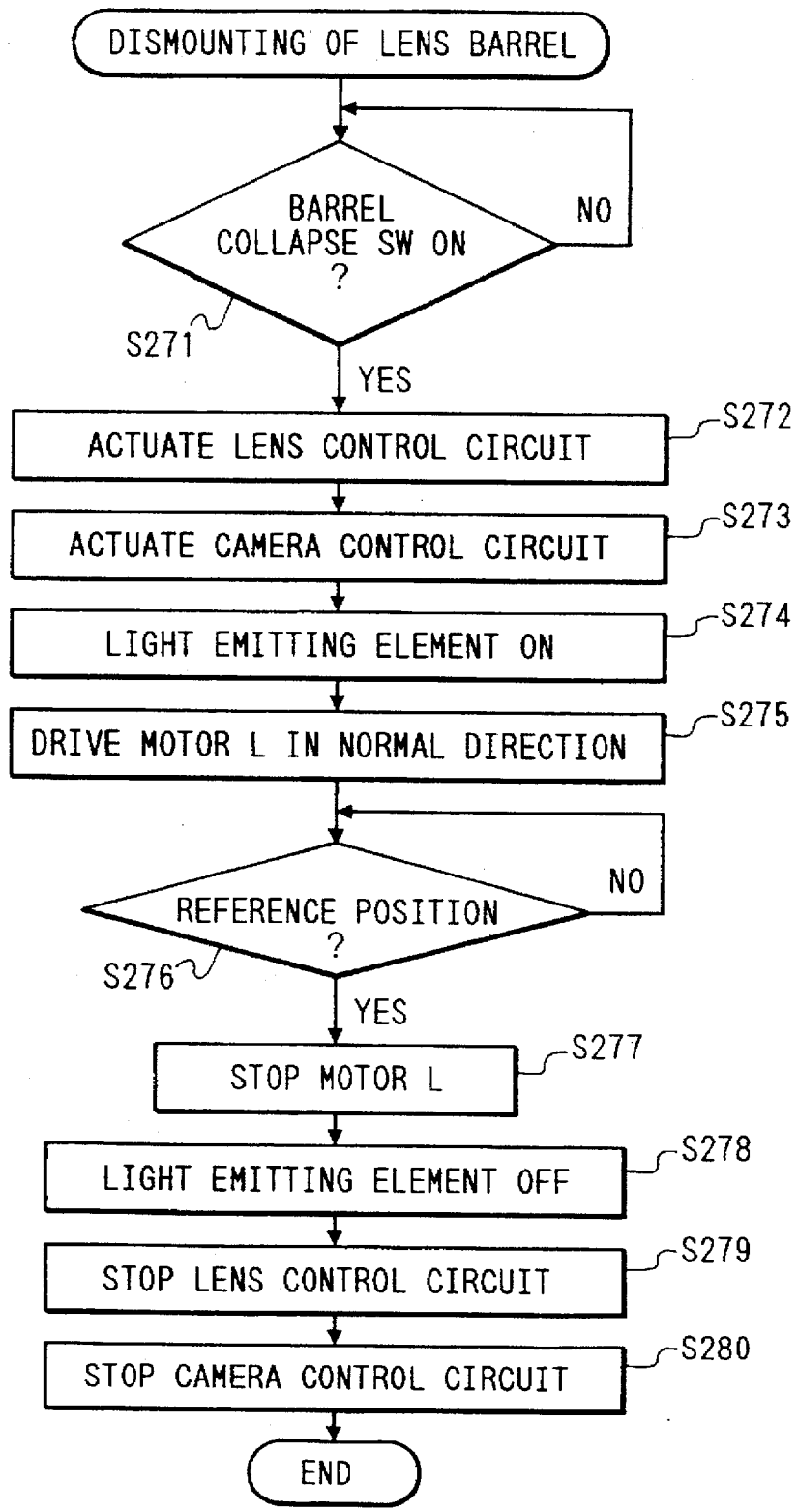

FIG. 26 is a flow chart executed when the lens barrel 204 is dismounted from the camera body 201.

The camera is first in an input wait state to wait for actuation of the barrel collapse switch 223 through a push on the barrel collapse switch 205 (Step S271).

When the barrel collapse button 223 is turned on, the lens control circuit 220 is actuated (Step S272).

And then, the camera control circuit 221 is actuated (Step S273).

Then, the light emitting element 217 is turned on (Step S274).

Then, the motor L is driven in the normal direction (i.e., rotating the motor L to move the lens barrel 204 to the projected position) (Step S275).

After that, a calculation based on an output of the light receiving element 218 is executed so as to determine whether the lens barrel 204 reaches the reference mounting position (Step S276).

Then, the motor L is stopped (Step 277).

And then, the light emitting element 217 is turned off (Step S278).

The lens control circuit is stopped (Step S279).

And then the camera control circuit is stopped to be in a rest state (Step S280).

Figure 27:
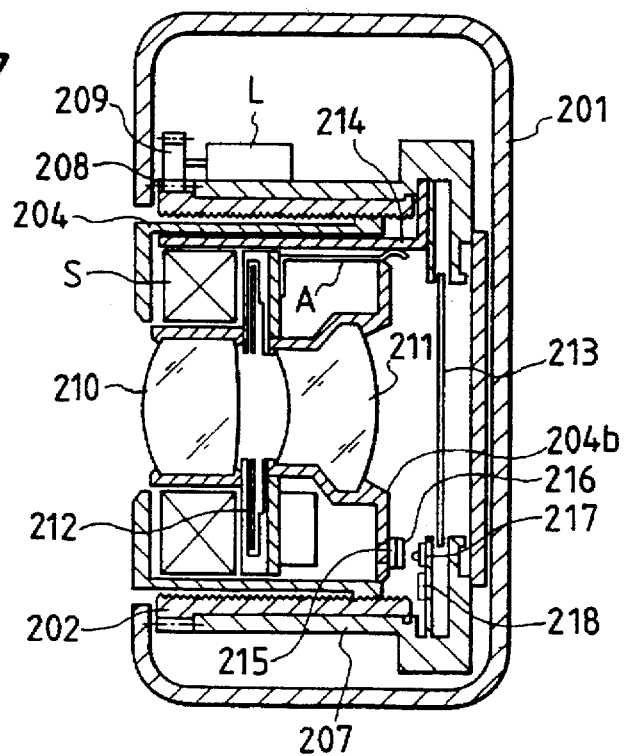

FIG. 27 shows the collapsed state.

At the time of the photographing, the motor L is actuated to drive the lens barrel to the position corresponding to data from the ranging circuit (not shown). At that time, reflection light of the infrared light emitted from the light emitting element 217 is received by the light receiving element 218 and a calculation based on an output thereof is executed to detect the position of the lens barrel 204.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera comprising:

a mount portion onto which a lens barrel housing a lens is mounted movably in a direction of an optical axis thereof;

a moving unit to move said lens barrel relative to said mount portion in the direction of the optical axis;

a limiting unit to set a limit of movement of the lens barrel moved by said moving unit relative to said mount portion in the direction of the optical axis while the lens barrel is mounted on the mount portion; and a limit removing unit to remove the limit of movement set by said limiting unit when said lens barrel is dismounted from said mount portion.

2. A camera according to claim 1, wherein:

said moving unit comprises a motor;

said limiting unit sets the limit of movement by limiting a drive of said motor using a first electric signal; and said limit removing unit removes the limit of movement by canceling the limit of the drive of said motor using a second electric signal.

3. A camera according to claim 1, wherein said lens barrel engages in mesh with said mount portion.

4. A camera according to claim 2, wherein said lens barrel engages in mesh with said mount portion.

5. A camera having a camera body, comprising:

a female screw provided on the camera body;

a lens barrel which is detachably mounted on the camera body, the lens barrel being provided with a male screw engageable with said female screw, and the lens barrel being mounted on the camera body through the engagement of said female screw and said male screw;

a driving device to rotate said female screw to move said lens barrel in a backward and a forward direction along the optical axis of the lens barrel;

a limiting unit to control said driving device so as to set a limit of movement of the lens barrel while said lens barrel is mounted on the camera body; and a limit removing unit to remove the limit of movement set by said limiting unit when said lens barrel is dismounted from said mount portion.

6. A camera according to claim 5, wherein:

said moving unit comprises a motor;

said limiting unit sets the limit of movement by limiting a drive of said motor using a first electric signal; and said limit removing unit removes the limit of movement by canceling the limit of the drive of said motor using a second electric signal.

7. A camera according to claim 5, wherein said driving device performs the dismounting of the lens barrel from the camera body by moving the lens barrel in the direction away from the camera body while the limit of movement of the lens barrel set by said limiting unit is removed by said limit removing unit.

8. A camera comprising:

a lens barrel detachably mounted to a camera body and movable relative to the camera body in a direction of an optical axis thereof so as to be retractable within the camera body:

a light emitting element, provided on one of the lens barrel and the camera body, for emitting light;

a reflection element provided on the other one of the lens barrel and the camera body, for reflecting the light emitted by said light emitting element;

a first light receiving element, provided on said one of the lens barrel and the camera body, for receiving light reflected by said reflection element; and a position determining device which determines distance between said reflection element and said first light receiving element based on the light received by said light receiving element so as to determine the position of the lens barrel with respect to the camera body.

9. A camera according to claim 8, wherein the position determining device determines whether or not the lens barrel is in a mounting/dismounting position.

10. A camera according to claim 8, wherein said position determining device determines that the lens barrel is not in a mounting position when said first light receiving element fails to receive the light reflected by said reflection element.

11. A camera according to claim 8, wherein said light emitting element emits light beams having different wavelengths and said first light receiving element discriminates between the light beams having different wavelengths, said beams of different wavelengths indicative of different types of photographic information.

12. A camera according to claim 8, further comprising:

a first conductive element provided on said lens barrel;

a second conductive element provided on said camera body; and said light emitting element and said position determining device are actuated in response to said first and second conductive elements coming into electrical connection with each other.

13. A camera according to claim 8, further comprising a second light receiving element provided on said other one of the lens barrel and the camera body and opposite to said light emitting element, to receive the light emitted from said light emitting element, wherein said light emitting element and said second light receiving element perform signal transmission of photographic information.

14. A camera according to claim 13, wherein:

said second light receiving element has a light receiving surface;

said reflection element comprises a half-mirror provided in front of the light receiving surface of said second light receiving element, the half-mirror transmitting a portion of the light emitted from said light emitting element to allow said signal transmission between said light emitting element and said second light receiving element, and reflecting the remaining portion of the light emitted from said light receiving element to be incident on said first light receiving element.

15. A camera according to claim 12, wherein said light emitting element emits light beams having different wavelengths and said first light receiving element discriminates between the light beams having different wavelengths, said beams of different wavelengths indicative of different types of photographic information.

* * * * *